United States Patent [19]
Yang et al.

[11] Patent Number: 5,653,181
[45] Date of Patent: Aug. 5, 1997

[54] SEPARATION OF PARTICULATE FROM FLUE GAS OF FOSSIL FUEL COMBUSTION AND GASIFICATION

[75] Inventors: Wen-Ching Yang, Murrysville; Richard A. Newby, Pittsburgh; Thomas E. Lippert, Murrysville, all of Pa.

[73] Assignee: Westinghouse Electric Corporation, Pittsburgh, Pa.

[21] Appl. No.: 356,982

[22] Filed: Dec. 15, 1994

Related U.S. Application Data

[63] Continuation-in-part of Ser. No. 108,155, Aug. 17, 1993, abandoned, which is a continuation of Ser. No. 749,782, Aug. 26, 1991, abandoned.

[51] Int. Cl.$^6$ .................................................. F23J 3/00
[52] U.S. Cl. .......................... 110/216; 422/144; 96/152
[58] Field of Search .......................... 96/131, 132, 150, 96/152; 55/474; 95/107; 110/203, 216, 234; 422/142, 144, 147

[56] References Cited

U.S. PATENT DOCUMENTS

| | | | |
|---|---|---|---|
| 3,912,466 | 10/1975 | Zenz | 55/96 |
| 3,940,237 | 2/1976 | Gonzalez . | |
| 3,960,529 | 6/1976 | Juntgen et al. | 55/390 |
| 3,987,148 | 10/1976 | Squires | 423/242 |
| 4,012,210 | 3/1977 | Morris | 55/479 |
| 4,451,272 | 5/1984 | Mathewes et al. | 55/390 |
| 4,492,771 | 1/1985 | Hasegawa et al. | 502/420 |
| 4,588,569 | 5/1986 | Cyran et al. | 423/244 |
| 4,622,210 | 11/1986 | Hirschberg et al. | 422/144 |
| 4,700,639 | 10/1987 | Esterson et al. | 110/347 |
| 4,880,608 | 11/1989 | Stelman | 423/244 |
| 4,973,459 | 11/1990 | Lippert et al. | 96/150 X |
| 5,039,507 | 8/1991 | Sturm | 423/569 |
| 5,462,654 | 10/1995 | Hering, Jr. | 210/97 |

FOREIGN PATENT DOCUMENTS

| | | |
|---|---|---|
| 0174109 | 3/1986 | European Pat. Off. . |
| 0370623 | 5/1990 | European Pat. Off. . |
| 0531620 | 3/1993 | European Pat. Off. . |
| 0531620A1 | 3/1993 | European Pat. Off. . |
| 4030896 | 4/1992 | Germany . |
| 61-33216 | 2/1986 | Japan . |
| 0198133 | 10/1986 | Japan . |
| 2100616 | 1/1983 | United Kingdom .................. 422/147 |
| WO89/07974 | 8/1989 | WIPO . |

OTHER PUBLICATIONS

Patent Abstracts of Japan, vol. 807, No. 219 (C–188), Sep. 29, 1983 & Japan A58114711 (Ube Kosan KK), Jul. 8, 1983.

*Primary Examiner*—Henry A. Bennett
*Assistant Examiner*—Susanne C. Tinker
*Attorney, Agent, or Firm*—M. G. Panian

[57] ABSTRACT

The gas from combustion or gasification of fossil fuel contains flyash and other particulate. The flyash is separated from the gas in a plurality of standleg moving granular-bed filter modules. Each module includes a dipleg through which the bed media flows into the standleg. The bed media forms a first filter bed having an upper mass having a first frusto-conical surface in a frusto-conical member at the entrance to the standleg and a lower mass having a second frusto-conical surface of substantially greater area than the first surface after it passes through the standleg. A second filter media bed may be formed above the first filter media bed. The gas is fed tangentially into the module above the first surface. The flyash is captured on the first frusto-conical surface and within the bed mass. The processed gas flows out through the second frusto-conical surface and then through the second filter bed, if present. The bed media is cleaned of the captured flyash and recirculated to the moving granular bed filter. Alternatively, the bed media may be composed of the ash from the combustion which is pelletized to form agglomerates. The ash flows through the bed only once; it is not recycled.

21 Claims, 6 Drawing Sheets

SEPARATION OF PARTICULATE FROM FLUE GAS OF FOSSIL FUEL COMBUSTION AND GASIFICATION

CROSS-REFERENCE TO RELATED APPLICATIONS

This application is a continuation in part of application Ser. No. 08/108,155, filed Aug. 17, 1993, hereby incorporated by reference, which is a continuation of application Ser. No. 07/749,782, filed Aug. 26, 1991, and both now abandoned.

REFERENCE TO GOVERNMENT CONTRACTS

Development for this invention was supported in part by U.S. Department of Energy contract DE-AC21-91MC27259. Accordingly, the United States government may have certain rights in the invention.

BACKGROUND OF THE INVENTION

This invention relates to the separation of particulate from high temperature, high pressure (HTHP) gas, predominantly in the generation of power for public consumption and in the gasification and combustion of coal. In particular, this invention relates to such separation effected by the formation of a moving granular-bed filter (MGBF) in a filtering vessel having a standleg designed to provide optimum removal of particulate from the gas passed through the filtering vessel. A second stage of filtration, also in granular-bed form, may be provided on the top surface of the MGBF to remove a substantial amount of the particulate which are known to be re-entrained into the flow of clean gas due to the movement of the MGBF.

Typical of the power generation system to which this invention may be adapted are pressurized fluid-bed combustion (PFBC), integrated coal gasification combined cycle (IGCC) and direct coal-fueled turbines (DCFT). However, it is to be understood that this invention may be adapted to purposes other than the generation of power or for use in systems other than PFBC, IGCC or DCFT.

Known moving granular-bed filters are commonly composed of granules as the filtering media. Such known granule systems are packed closely and move at a mass rate of about between 40 times to 100 times the flow of particulate in the gas. In accordance with the teachings of the prior art, the bed media are commonly granules of alumina ($Al_2O_3$) or other compounds which are chemically stable at the temperature at which the filtering operation takes place. However, alumina granules and the like are costly and it is necessary to recycle the granules through the bed so as to operate at a reasonable cost. This necessity for recycling of the moving bed media introduces design complexity, demands an unreasonably large plant and militates against sound and reliable operation. In addition, the demand for recycling carries with it the requirement for bed media cleaning, wear of the lift pipe that returns the granules, granule degradation, lift gas recompression, and complexities caused by temperature and pressure drop and pressure balancing.

Typical granular-bed filters are arranged with granule flow downward and gas flow upward. The gas velocity through the unit is limited to levels where the granules will not fluidize because of the upward gas flow. Typical granular bed filters are large in diameter and require complex equipment to distribute granules uniformly to the top surface in order to yield acceptable granule and gas flow through the unit.

Thus, there is a need for an improved filtering system which removes a substantial portion of the particulate from the gas in a reliable and cost effective manner. The present invention provides a system which satisfies that need.

SUMMARY OF THE INVENTION

In accordance with this invention, an improved mechanical configuration of a moving granule-bed filter is provided that distributes the granules to the filter reliably and allows operation with small mass rates of about 10 to 40 times the flow of particulate in the gas. The granules can be recirculated with a conventional pneumatic system, or the ash from the process can be pelletized to serve as the medium for the moving granular-bed filter. There is provided a method for separating particulate from the gas in whose practice the gas is filtered through one or a plurality of moving granular-bed filter modules. In one arrangement, the filter members are composed of pelletized or agglomerated ash from fossil fuel combustion or from gasification. Since the ash is expendable, it need not be recycled, i.e., filtering members are passed through the bed only once. The complexities and problems of the recycling of the media are thus eliminated. In addition, because the ash is pelletized, the dust problems associated with handling are reduced, the ash volume is reduced by about 25%, and the resistance to leaching is improved. Moreover, the standleg design within the filtering vessel of each of the modules provides for optimum removal of particulate from the gas. If extremely high efficiency is required, a second stage filter bed, formed above the moving bed, may be added for removal of a substantial amount of the particulates that are re-entrained into the flow of clean gas due to the movement of the MGBF.

Ash is typically removed from the bottom of the combustor or gasifier. In addition, the gas, on its way to the power converters, passes through one or more cyclones which separates out particulate, for example, fly ash. In the practice of this invention, the ash from the bottom of the combustor or gasifier and the ash from the cyclone or cyclones are preferably combined to act as the bed media for the MGBF. The ash is pelletized into larger agglomerates and then passed into each moving granular-bed filter module. Pelletization is preferable in accordance with the invention because, if the bed is formed of small particles, the processed gas would entrain the particles. Alternatively, the bed media could also be formed from specially procured alumina granules.

For treating the gas effectively to separate particulate, each module includes a vessel in accordance with this invention having a dipleg and a standleg. The bed media is supplied through the dipleg to the standleg. The dipleg releases filtering member media onto a mass having a frusto-conical surface which extends from or near the upstream end of the bed media inlet of the standleg. The dipleg is of substantial length to suppress back-flow of the gas received in the filter vessel and passed through the standleg.

As the bed media filter members flow out of the standleg, they also build up as a mass with a frusto-conical surface. When the polluted gas is passed through the standleg, the particulate in the gas predominantly deposits near the upper frusto-conical surface of the mass formed at the standleg inlet and the clean gas flows out through the lower frusto-conical surface of the mass formed at the standleg outlet. The lower frusto-conical surface of the mass, which is below the outlet of the standleg, is of substantially greater area than the upper frusto-conical surface of the mass at the standleg inlet, providing a large area for the discharge of clean or processed gas. For improved particulate removal, a second-stage mass of filtering member bed media can be provided, with intermittent or continuous bed media flow, on top of the lower frusto-conical surface of the mass of moving filtering member bed media formed near the standleg outlet.

In the practice of this invention, the moving granular-bed filter module may be operated continuously or intermittently. If the bed media is continually removed, the necessity of cleaning the bed of pollutant deposit is dispensed with. The bed is closely packed having a voidage of 50% or less. The particulate is trapped on the surfaces of the pellets which form the bed. As the feed of gas continues, cake builds up on the bed surface. In the continuous operation, the cake is progressively carried away in the moving bed. The discontinuous operation involves a valve at the outlet of the hopper (or vessel). The valve is normally closed, but it opens in response to the increase in pressure drop produced by the dust on the pellets of the bed.

In cold-flow simulation tests aimed at determining the efficacy of the standleg-MGBF in accordance with the invention, as well as in high-temperature, high-pressure tests at conditions simulating pressurized fluidized bed combustion, a removal efficiency of greater than 99.9% was achieved.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF THE PREFERRED EMBODIMENTS

In the power-generating apparatus 11 shown in the drawings, the primary energy source is a reactor 13 from which gas, typically created by pressurized fluid-bed combustion (PFBC) of fossil fuel, is derived. The reactor 13 is representative of any source for generating the gas and, in actual practice, may be a combustor or a coal gasifier. The heat developed in the reactor 13 may also serve to generate steam for driving steam turbines through the use of steam lines 15. Crushed coal, pulverized dolomite and air are supplied to the reactor 13 by conductors 17, 19 and 21 respectively. The dolomite forms the fluid bed 23 and serves the additional purpose of removing the sulfur oxides, at least in part, from the coal. The reactor 13 typically operates at a temperature of 1550° F. (843° C.) and at a pressure of 10 atmospheres (103, 330 kg/m$^2$). Ash from the combustion is deposited in the bottom of the reactor 13.

Figure 1:
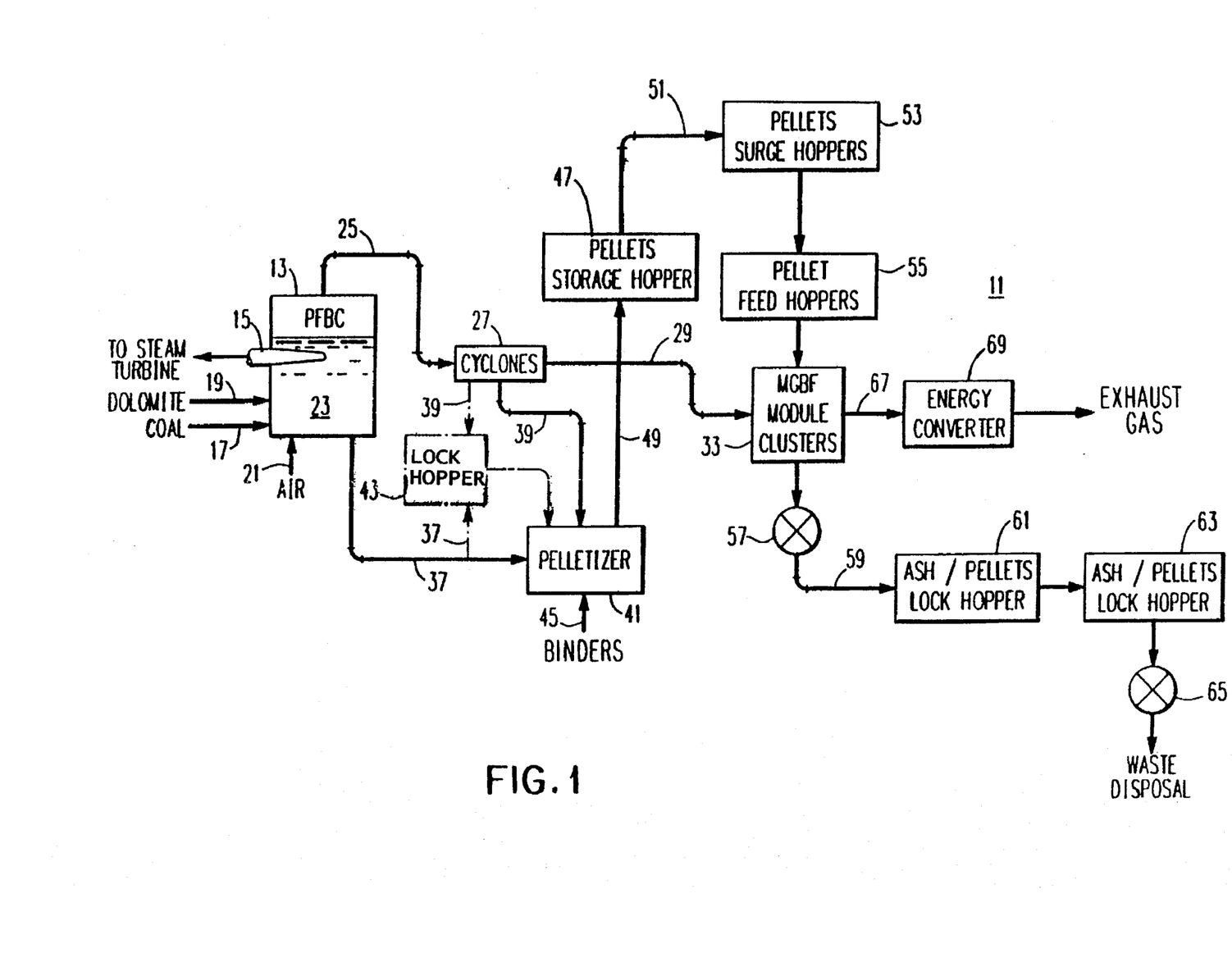
FIG. 1 is a block flow diagram showing an embodiment of this invention and illustrating the practice of a method of this invention.
Figure 2:
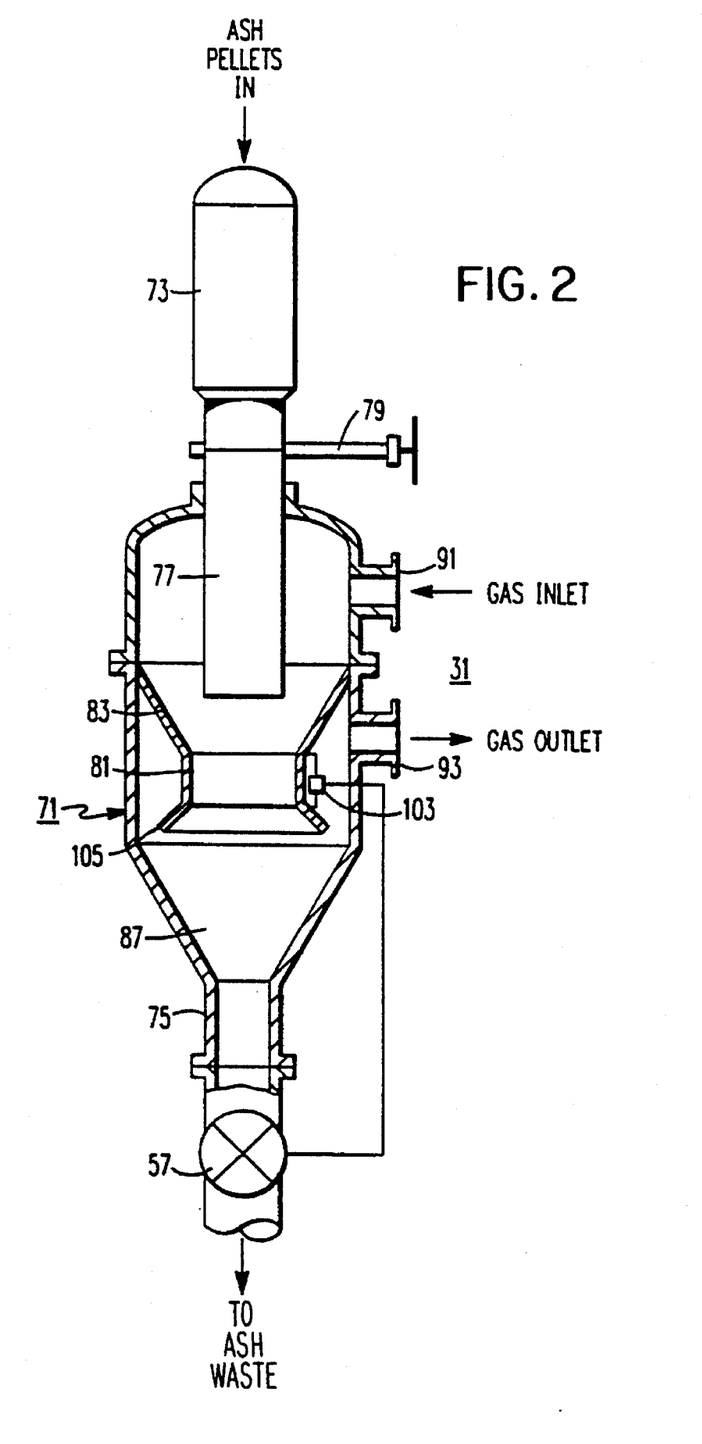
FIG. 2 is a view in side elevation and partially in longitudinal section of a module for creating a moving granular-bed filter in accordance with this invention and for the practice of a method of this invention.
Figure 3:
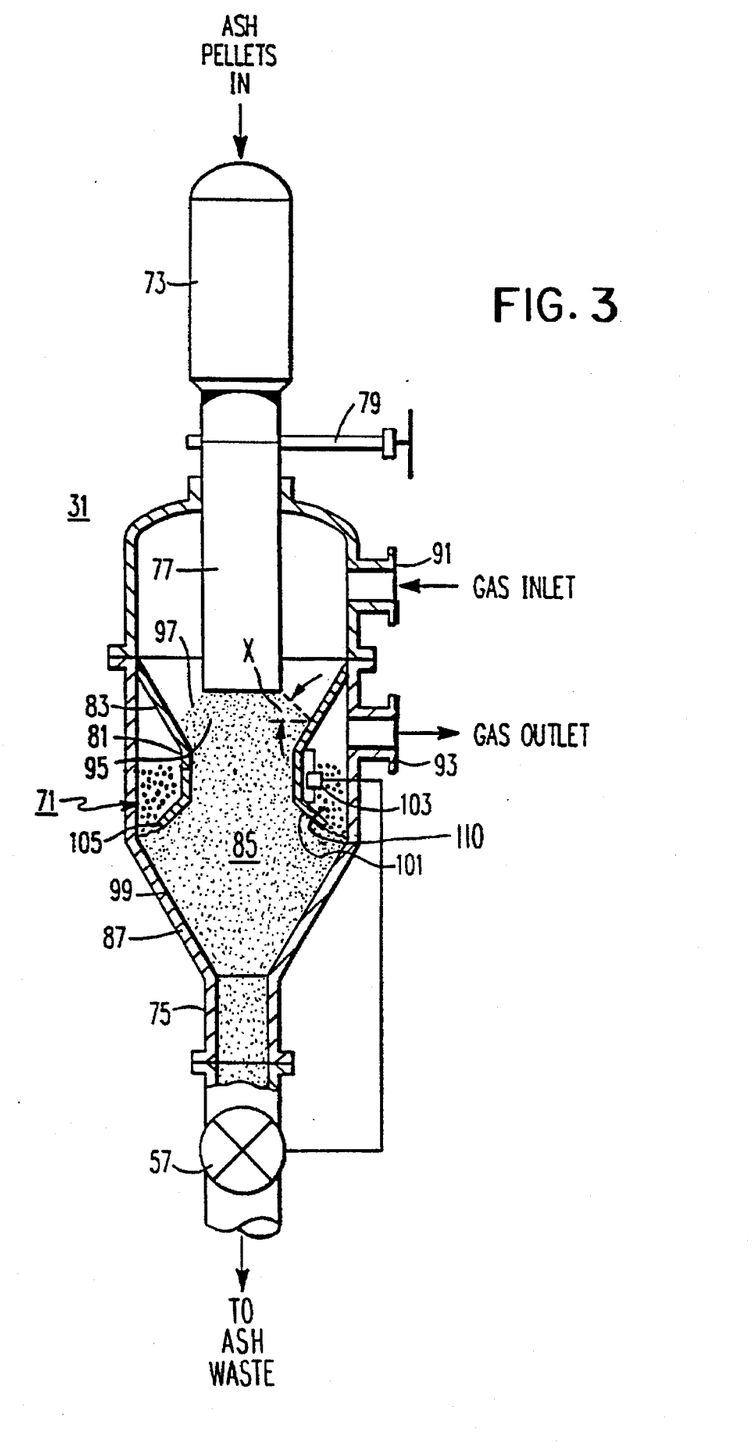
FIG. 3 is a view similar to FIG. 2 but showing the moving granular-bed filter.
Figure 4:
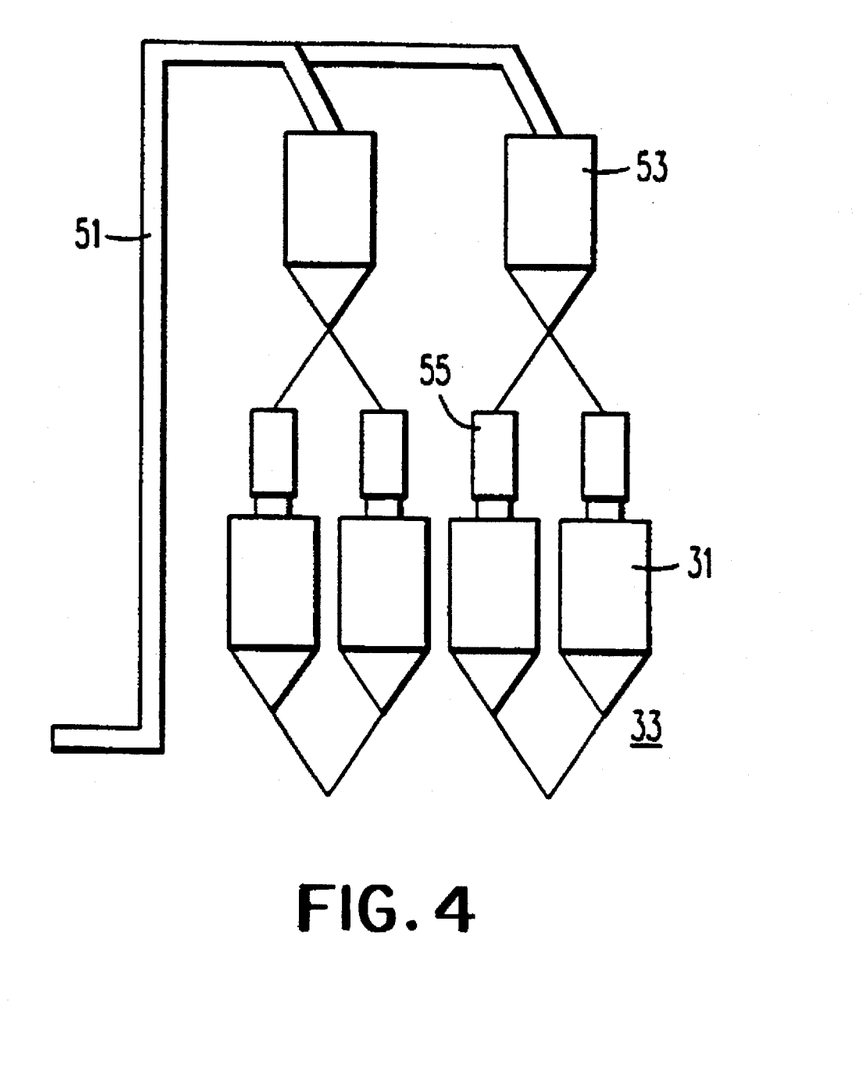
FIG. 4 is a view in side elevation, generally diagrammatic, showing the adaptation of this invention to pressurized fluid-bed combustion.

In the typical use of the reactor, the gas is conducted by conductor 25 to cyclones 27, which remove a substantial portion of the fly ash. From the cyclones 27, the gas is fed by conductors 29 to the moving granular-bed filter modules 31 (one of which is shown in FIGS. 2 and 3), which are arrayed in clusters 33 (two of which are shown in FIG. 4). The ash derived from the cyclones 27 is combined with the ash deposited in the bottom of reactor 13 to serve, after pelletization, as the bed 85 (FIG. 3) in each of the modules 31. As used herein, with reference to the medium of the MGBF, the term "ash" includes the ash deposited in the bottom part of a reactor 13 (FIG. 1) or other like facility in which fossil fuel is burned, and also the ash, if any, which forms part of the medium of the MGBF that is derived from the cyclones 27 or like apparatus in a combustion process.

The ash from the cyclones 27 and the bottom of reactor 13 are fed by conductors 37 and 39 into a pelletizer 41 which, using conventional methods, converts the small particles of the ash into larger pellets. The ash pellets, as compressed, may be generally spherical or cylindrical and typically have a diameter of about ¼ to ½ inch (0.6 to 1.3 cm).

In the practice of this invention, it may be necessary to carry out the pelletization under atmospheric pressure. To achieve this purpose, the ash from the bottom of the rector 13 and the ash from the cyclones 27 are fed to the pelletizer 41 through a lock hopper 43 (shown in broken lines) through the conductors 37 and 39. Binders, such a lime and water or various clays, are fed into the pelletizer 41 through conductor 45.

The pellets from the pelletizer 41 are fed into a storage hopper 47 through conductor 49. Thence they are fed by conductor 51 into surge hoppers 53 which stabilize the flow of ash pellets by providing surge capacity. Thence the pellets are fed through feed hoppers 55 into the moving granular-bed filter modules 31 of the clusters 33. In the instant apparatus there are four clusters 33, two of which are shown in FIG. 4. Further, each cluster 33 has four modules 31, two of which are shown for each of the clusters shown in FIG. 4. Each cluster 33 is fed through a surge hopper 53 and each module 31 is fed through a feed hopper 55. Where the pelletizers 41 operate at atmospheric pressure, the surge hopper 53 and feed hopper 55 are lock hoppers which serve to repressurize the pellets as they flow to the moving granular-bed filter module 31.

The flow of the bed through the module 31 is controlled by a water-cooled rotary valve 57 (FIG. 1), or by a screw feeder. The pellets passed by the valve 57 are fed by a conductor 59 to lock hoppers 61 and 63 which operate to depressurize them. From lock hopper 63, the pellets are discharged to waste disposal under the control of a valve 65. The processed gas is discharged by the filter module 31 through conductor 67 and then drives an energy converter 69, such as one or more turbines. Finally, the gas is exhausted. The discharged "clean" process gas is free of particulates.

The moving granular-bed filter module 31 in accordance with this invention will now be described with reference to FIGS. 2, 3 and 3a. This module includes a gas-tight vessel 71 of circular transverse cross-section having ash pellet feed hopper 73 and an outlet 75. The pellets flow from the feed hopper 73 into a dipleg 77 under the control of a slide valve 79, which has only fully open and fully closed settings. From the dipleg 77, the pellets flow into a standleg 81 to form the bed 85 (FIG. 3). According to an important aspect of the current invention, the standleg 81 has a frusto-conical inlet 83 that extends from the upstream end of a cylindrical central portion 84 and a frusto-conical outlet skirt 105 that extends from the downstream end of the cylindrical portion. The dipleg 77 extends into the frusto-conical standleg inlet 83 and is of substantial length to preclude the back flow of the gas. From the standleg 81, the pellets flow into a hopper 87 and thence out through the vessel outlet 75 under the control of valve 57.

The vessel 71 has a gas inlet 91 which opens near the top of the vessel and feeds the gas tangentially into the vessel. The vessel also has a gas outlet 93 which opens opposite the standleg 81. Thus, according to another important aspect of the current invention, the flow of both gas and pellets through the bed 85 is substantially concurrent—that is, vertically downward—rather than countercurrent. The concurrent nature of the gas/pellet flow reduces the tendency of the gas to fluidize the bed. This is a desirable feature since fluidization would cause particulates to become re-entrained into the gas, thereby impairing the ultimate effectiveness of particulate removal. Consequently, higher gas velocities than would otherwise be possible can be safely utilized. The use of higher gas velocities permits a reduction in the diameter of the vessel 71 and simplifies the manner in which the pellets must be introduced into the vessel.

The flow of the pellets is shown by the dots in FIG. 3. As the pellets flow from the dipleg 77 into the standleg 81, a mass 95 of the pellets is formed, the upper portion of which builds up in the frusto-conical standleg inlet 83. This upper portion of the pellet mass 95 has a surface 97 of generally frusto-conical shape. The angle of repose is defined as the angle that the surface of a pellet mass would make if the pellets were deposited on a flat surface and is essentially a physical property of the pellets themselves. According to the current invention, the angle X of the pellet mass surface 97 with respect to the horizontal, shown in FIG. 3, is equal to the angle of repose associated with the pellets. This ensures a large area for the surface 97.

Below the standleg inlet 83, the pellets flow through the standleg 81 and build up above the hopper 87 in a lower portion 99 of the pellet mass 95. The lower portion 99 of the pellet mass 95 has a frusto-conical surface 101 of substantially greater area than the surface 97 of the upper portion of the pellet mass.

The gas entering through the gas inlet 91 sweeps around the surface 97, penetrating through the pellets below the surface and moving downwardly concurrently with the bed. The purpose of the frusto-conical standleg inlet 83 is to produce the surface 97 so that the incoming gas is afforded a substantial area to react with the pellets of the moving bed. As the gas passes from the frusto-conical standleg inlet 83 into the standleg cylindrical portion 84, its velocity is increased. The residual fly ash in the gas is captured and builds up on the frusto-conical surface 97 and within the mass 95. The resulting gas passes through the bed giving up any residual particulate to the pellets and exits through the larger frusto-conical surface 101.

When the gas exits the cylindrical portion 84 of the standleg 81, the increase in diameter between the standleg 81 and the vessel 71 causes a drop in the average gas velocity. Nevertheless, were it not for the presence of the outlet skirt 105, discussed below, locally high gas streams would exist and create re-entrainment of particulate in the gas flowing upward toward the gas outlet 93.

Figure 3A:
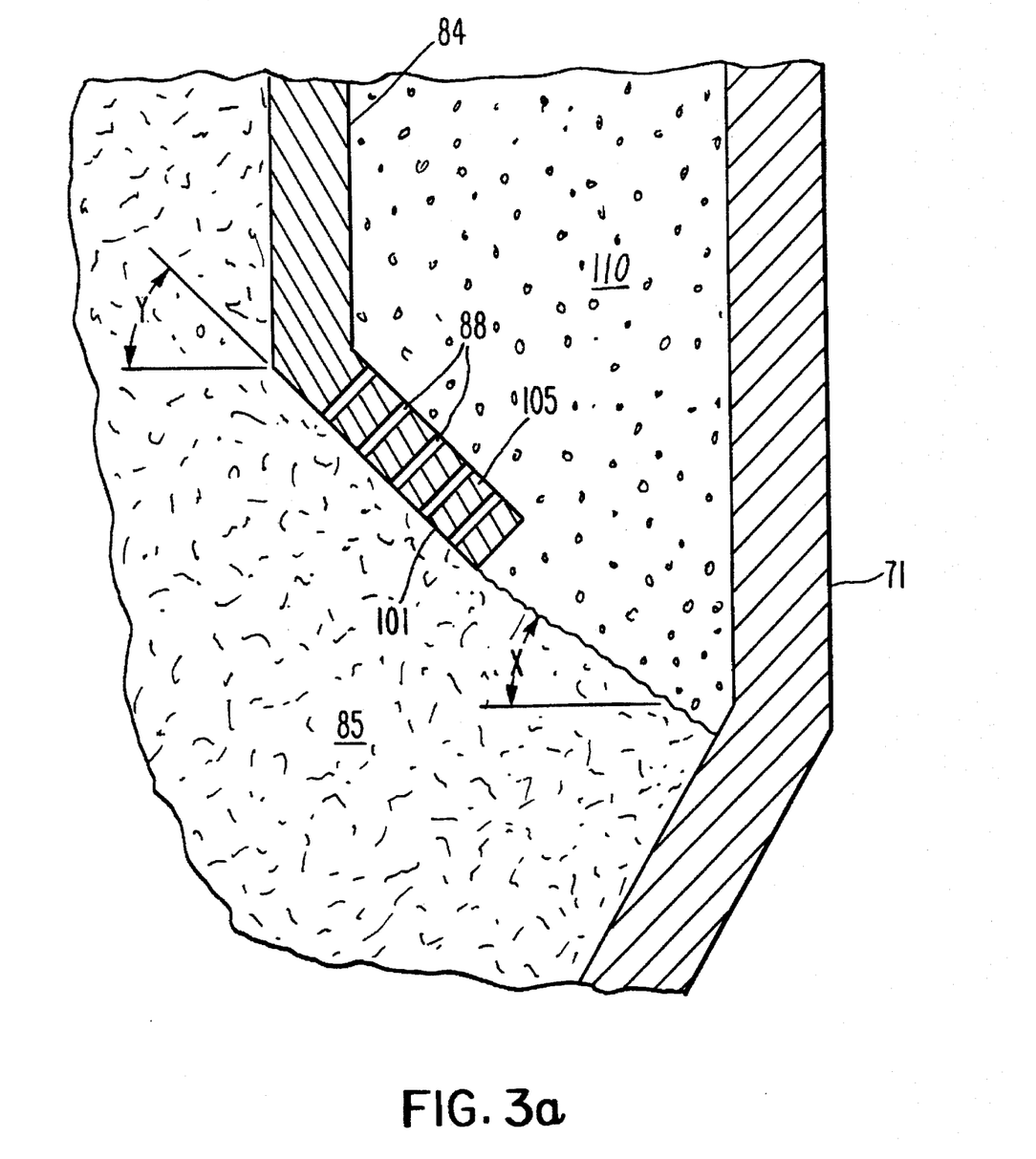
FIG. 3a is a detailed view of a portion of the module shown in FIG. 2 in the vicinity of the standleg outlet.

Therefore, according to the current invention, the discharge end of the standleg 81 forms a flared, frusto-conical skirt 105 that extends at least part way from the cylindrical portion 84 of the standleg to the surface of the vessel 71, as shown best in FIG. 3a. Typically, the skirt 105 extends sufficiently far to cover at least 20% of the pellet mass surface 101.

Preferably, the skirt 105 is perforated with holes 88 that allow a portion of the gas to bleed through the skirt, thereby aiding in the distribution of the gas flow. The diameter of the holes 88 in the skirt 105 is preferably smaller than the smallest pellets, thereby preventing passage of the pellets through the skirt. Since the skirt 105 extends only over the upper portion of the surface 101, the flow of processed gas through the surface 101 continues through the portion of the surface 101 not covered by the skirt even in the unlikely event that the holes 88 in the skirt 105 become plugged. Although the frusto-conical outlet of the standleg 81 is shown as being formed by a skirt 105 that is integral with the cylindrical portion 84 of the standleg, a screen or other perforated member could also be attached to the cylindrical portion 84 so as to form the frusto-conical outlet.

According to the current invention, the skirt 105 allows gradual expansion of the gas, and, therefore, a gradual reduction in its velocity, as it exits the standleg 81. Such gradual expansion inhibits the creation of localized high velocity gas streams that might otherwise flow upward toward the vessel gas outlet 93 causing re-entrainment of particulate.

According to another important aspect of the current invention, the skirt 105 forms an angle Y with respect to the horizontal that is greater than the angle of repose X associated with the pellets in the bed 85, as shown in FIG. 3a. The skirt 105 causes the portion of the bed surface 101 directly beneath it to follow its surface so that this portion of the pellet mass surface 101 forms an angle Y that is greater than the angle of repose, thereby increasing the area of surface 101. This increase in surface area reduces the gas velocity though the surface 101.

Thus, the skirt 105 serves to minimize the tendency of the moving bed 85 to become fluidized below the standleg 81, which would result in re-entrainment of particles. In fact, no fluidization was observed in cold flow tests conducted at a standleg face velocities up to 13.4 ft/s (4.02 m/s) with stone chips as the bed media with a minimum fluidization velocity of 6.1 ft/s (1.83 m/s).

After exiting from the standleg 81, the pellet mass 95 forming the bed 85 moves out through the valve 57, either continuously or intermittently, such that there is relative movement, or tumbling, of the filtering member pellets, particularly at or near the surface 101. This relative movement has been found to cause a certain portion of the particulate collected by the filtering member pellets to become re-entrained into the flow of gas as it turns vertically upward and exits through the surface 101.

Thus, according to another important aspect of the current invention, a second-stage mass 110 of filtering members may be provided, either intermittently or continuously, on top of the pellet mass surface 101. The second bed mass 110 serves to remove the re-entrained particulates from the gas exiting through the pellet mass surface 101. The second mass 110 is comprised of filtering member provided externally of the standleg 81 in a manner discussed below with reference to FIGS. 5e and 5f and may be of the same or different composition as the filtering members of the first mass 95. After flowing through surface 101, the gas flows upwardly through the second mass 110 in countercurrent flow and then through the gas outlet 93 as processed gas substantially free of particulate. The processed gas is then fed to the energy converter 69 (FIG. 1).

Accordingly, the present invention provides for two-stage particulate removal, the first stage being the concurrent flow of gas and the moving bed media through the standleg 81. The majority of the particulate is collected in this stage. The second stage involves counterflow, with the gas flowing upward through the second mass 110 bed media as that bed moves downwardly, and serves to trap the particulates which have been re-entrained into the gas flow. It should be noted that the second mass 110 piles upon the surface 101 of the mass 95 and thus, since the first mass is moving, the filtering members from the second mass will eventually co-mingle with the filtering members of the first mass. However, the rate of downward movement of the second mass 110 can be significantly less than that of the first mass 95. The relative amount of bed movement for both the first mass 95 and the second mass 110 can be controlled based upon the design of the hopper system.

The bed 85 may flow continuously or intermittently. For intermittent flow, the valve 57 may be operated responsively to a pressure drop measuring device 103. The valve 57 is normally closed. As the particulate builds up on the surface 97, the pressure drop of the gas as it passes through the bed increases. At a predetermined pressure drop, the valve 57 is opened and the pellet bed and the captured particulate discharges through the valve. The valve 57 then re-closes and the particulate again builds up. The appropriate surfaces 97 and 101 are maintained by the feed of pellets through the dipleg 77.

Figure 5A:
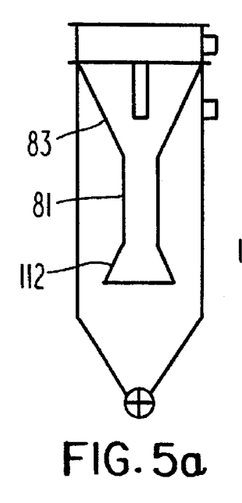
FIG. 5 is a schematic showing various embodiments of a filtering vessel in accordance with the invention.
Figure 5B:
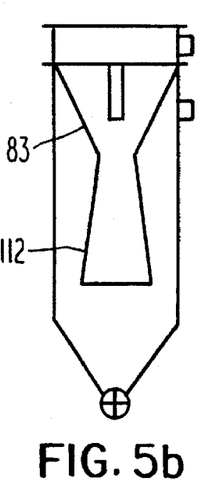
Figure 5C:
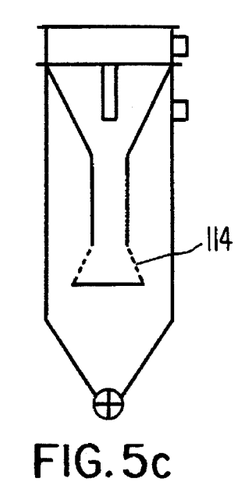
Figure 5D:
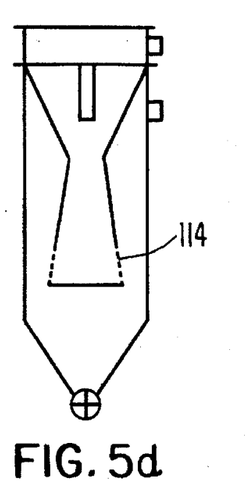
Figure 5E:
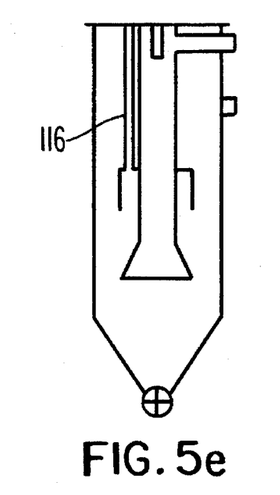
Figure 5F:
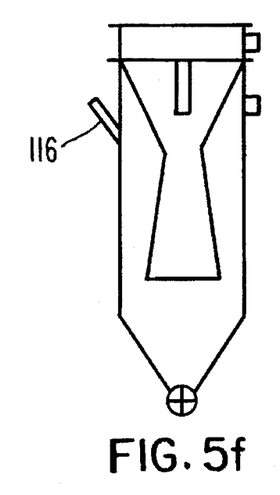

FIGS. 5a–5f shows preferred embodiments of filter vessels 71 in accordance with the invention. In FIG. 5a, the standleg 81 comprises a frusto-conical shaped standleg inlet 83, a straight cylindrical central portion and an integral frusto-conical shaped standleg outlet skirt 112. In the embodiment shown in FIG. 5b, there is no straight cylindrical portion and the standleg comprises the frusto-conical shaped standleg inlet 83 and standleg outlet 112. The embodiments shown in FIGS. 5c and 5d are similar to those shown in FIGS. 5a and 5b respectively, with a portion of the standleg outlet skirt being perforated at 114. FIGS 5e and 5f show inlets 116 for providing the filter members that form the second mass 110 externally of the standleg. In the embodiment shown in FIG. 5e, the inlet 116 provides a continuous supply of filter members for the second mass 110. As shown in FIG. 5f, the filter members for the second mass 110 may be provided intermittently through an inlet 116.

Table I presents the principle data involved in the adaptation of this invention to a pressurized fluid-bed combustion plant and direct coal-fueled turbine (DCFT) plant, each operating at 330 megawatt electrical power.

In plant operation, the bottom ash and cyclone catch from PFBC and coal gasifier are collected and pelletized in the pelletizer 41 to a diameter of about ¼ to ½ inch (0.6 to 1.3 cm) to serve as the media for the moving granular-bed filter. However, if the fraction of ash particles larger than ½ inch (1.3 cm) diameter is small, simple screening before pelletization may be feasible.

TABLE I

| | PFBC | Coal Gasifier | DCFT |
|---|---|---|---|
| Plant Capacity (MWe) | 330 | 330 | 330 |
| Gas Temperature | 1550° F. | 1200° F. | 1850° F. |
| | (843° C.) | (649° C.) | (1010° C.) |
| Pressure (psia) (g/cm²) | 215 (15,115) | 295 (20,739) | 183 (12,796) |
| Gas Flow (lb/hr) | 2,885,000 | 1,050,532 | 8,018,227 |

TABLE I-continued

| | PFBC | Coal Gasifier | DCFT |
|---|---|---|---|
| (kg/hr) | (1,311,364) | (477,515) | (3,644,649) |
| (acfm) | 165,240 | 43,927 | 625,422 |
| (m³/min) | (4,679) | (1,244) | (17,710) |
| Flyash Flow (lb/hr) | 1,442 to 7,212 | 2,388 | 4,000 |
| (kg/hr) in the gas | (655 to 3,278) | (1,085) | (1,818) |
| (ppmw) | 500 to 2,500 | 2,272 | 500 |
| Bottom Ash Flow (lb/hr) | 28,255 | 40,000 | |
| (kg/hr) | (12,843) | (18,182) | |
| Cyclone Catch (lb/hr) | 41,832 to 36,062 | 35,833 | 57,826 (slag) |
| (kg/hr) | (19,015 to 16,392) | (16,288) | (26,285) |
| Solid Waste (lb/hr) | 71,529 | 75,833 | 61,826 |
| (kg/hr) | (32,513) | (35,555) | (28,103) |
| MGBF Media Flyash Ratio | 48.6 to 8.9 | 31.8 | 14.5 |
| Maximum Pressure Drop (psi) | 5 | 5 | 5 |
| (gm/cm²) | (352) | (352) | (352) |
| Maximum Temperature Drop | 4° F. (2.2° C.) | 15° F. (8.3° C.) | 10° F. (5.6° C.) |
| Particle Removal Efficiency (%) | 95 to 99 | 99 | 98 |
| Maximum Outlet Dust Loading (ppmw) | 25 | 69 | 9 |

The total cyclone catch in the PFBC plant ranges from 36,062 to 41,832 lb/hr (16,392 to 19,015 kg/hr), depending on the cyclone efficiency. This gives a MGBF media/fly ash ratio of 8.9 to 48.6, assuming all the bottom ash and cyclone catch are pelletized to provide the bed media for the MGBF (Table I). In the case of KRW coal gasifier, the ratio is 31.8. These ratios are well within the desired range of bed material/particulate ratio, 10 to 40, employed experimentally in cold-flow, and in high temperature, simulation tests. In fact, if the moving bed is operated intermittently to allow a thin particulate layer to build up on the bed surface, the MGBF media/flyash ratio can even be smaller.

In the case of DCFT plants, the quenched slag is already in granular frit form, simple screening at system pressure may be employed to recover the desirable size fraction to use as the moving bed media. No de-pressurization of ash frits and re-pressurization of bed media are required.

Several options are available in ash handling and pelletization for MGBF media. An alternative is to reduce the pressure to the atmospheric pressure from the pressure in boiler 13 and to perform necessary screening, pulverization (if required), and pelletization of ash pellets at atmospheric pressure. The ash pellets are then transported either pneumatically or mechanically to the lock hoppers to be re-pressurized for feeding into the MGBF. Alternatively, pelletization can be carried out under hot and/or pressurized conditions.

For pellet transport, both mechanical and pneumatic transport can be employed. Conventional lock hopper systems can be utilized to pressurize the pellets for feeding into the MGBF. Conventional lock hopper systems can also be used for media pressure reduction. Alternately, the concept of restricted pipe discharge system (RPDS) developed by the Institute of Gas Technology, under sponsorship of DOE, can be employed for continuous de-pressurization of solids.

Table II presents typical dimensions for the modules 31 and the associated surge hoppers 53 and feed hoppers 55 for 330 MWe PFBC, coal gasification and DCFT plants.

Table II shows that sixteen modules 31 are used for the 330 MWe PFBC plant. The sixteen modules are arranged in four clusters 33 (two of which are shown in FIG. 4) of four modules 31 each (two of which are shown for each of the two clusters shown in FIG. 4). The complete ash stream from the PFBC is processed through four separate ash pelletizers 41 (not shown in FIG. 4) feeding the four ash pellet surge hoppers 53, one for each cluster. Each ash pellet surge hopper 53 is typically 10 feet (3 m) in diameter and about 25 feet (7.5 m) high, and has a capacity three times the hourly pellet flow. The transfer of ash pellets to these hoppers can either be mechanical or pneumatic. An important consideration for the selection of transport system is to minimize the attrition and decrepitation of ash pellets. Because all plant ash is pelletized, the ash waste from the plant is in pellet form which facilitates handling and disposal.

TABLE II

| | PFBC | Gasifier | DCFT |
|---|---|---|---|
| S-MGBF: | | | |
| Standleg 81 Dia. (ft) (m) | 6 (1.8) | 6 (1.8) | 6 (1.8) |
| Standleg Ht. (ft) (m) | 3 (0.9) | 3 (0.9) | 3 (0.9) |
| Dipleg 77 Dia. (ft) (m) | 4 (1.2) | 4 (1.2) | 4 (1.2) |
| Dipleg Ht. (ft) (m) | 4 (1.2) | 4 (1.2) | 4 (1.2) |
| Vessel 71 Dia. (ft) (m) | 13 (4.0) | 13 (4.0) | 13 (4.0) |
| Vessel Ht. (ft) (m) | 30 (9.1) | 30 (9.1) | 30 (9.1) |
| No. of Modules 31 | 16 | 4 | 36 |
| Pellet Feed Hopper 55 (FIG. 4): | | | |
| Vessel dia. (ft) (m) | 5 (1.5) | 5 (1.5) | 5 (1.5) |
| Vessel Ht. (ft) (m) | 15 (4.6) | 15 (4.6) | 15 (4.6) |
| No. of Modules | 16 | 4 | 36 |
| Pellet Surge Hopper 53 (FIG. 4): | | | |
| Vessel Dia. (ft) (m) | 10 (3) | 10 (3) | 10 (3) |
| Vessel Ht. (ft) (m) | 25 (7.6) | 25 (7.6) | 25 (7.6) |
| No. of Modules | 4 | 1 | 9 |

Each ash pellet surge hopper 53 feeds four lock hoppers 55 (only two of which are shown in FIG. 4) located on top of the four MGBF modules 31. The dimensions of each ash pellet feeding lock hopper 55 is 5 feet (1.5 m) in diameter and 15 feet (3.5 m) high. The feed hoppers are always maintained at the system pressure, while the ash pellet surge hoppers cycle between the system pressure and the atmospheric pressure. From the lock hoppers, the ash pellets are fed into the MGBF through a 4-foot (1.2 m) dipleg 77 (not shown in FIG. 4) by gravity.

The complete standleg-MGBF system for the PFBC plant can be erected in a 60-foot (18 m) by 60-foot (18 m) plot with a maximum height of about 100 feet (30 m).

For the 330 MWe gasifier, one cluster of four MGBF modules 31 is required. In the case of DCFT plant, nine clusters with a total of 36 MGBF modules 31 are needed because of a substantially higher gas flow rate.

While preferred embodiments of this invention have been disclosed herein, many modifications thereof are feasible. This invention is not restricted except insofar as is necessitated by the spirit of the prior art.

We claim:

1. An apparatus for removing particulates from a flow of gas, comprising:

a) a vessel having a gas inlet for receiving said flow of gas and a gas outlet for discharging said flow of gas, said vessel forming a gas flow path between said gas inlet and said gas outlet;

b) means for introducing a flow of a first filter media into said vessel so as to form a first filter media bed therein, said first filter media having means for capturing at least a portion of said particulates in said gas;

c) a filter media outlet for discharging said first filter media from said vessel, whereby said first filter media flows through said vessel; and d) flow directing means comprising a standleg, for directing both said gas and said first filter media to flow in a first direction through a first portion of said gas flow path and then for turning said gas so that said gas flows in a second direction through a second portion of said gas flow path, wherein said standleg further comprises an approximately frusto-conical portion for preventing re-entrainment of said particulate captured by said first filter media back into said gas as said gas flow turns from said first direction to said second direction.

2. The apparatus according to claim 1, wherein said second direction is opposite from said first direction.

3. The apparatus according to claim 2, wherein said first direction is vertically downward and said second direction is vertically upward.

4. The apparatus according to claim 1, further comprising means for directing said flow of said first filter media so that said first filter media forms an approximately frusto-conical surface below said frusto-conical portion of said standleg.

5. The apparatus according to claim 1, wherein said first filter media comprises pellets, said pellets having an angle of repose associated therewith, and wherein said frusto-conical portion of said standleg forms an angle with respect to the horizontal that is greater than said angle of repose of said pellets.

6. The apparatus according to claim 1, wherein said standleg has an inlet, and wherein said flow directing means has means for forming said first filter media into an approximately frusto-conical surface above said frusto-conical standleg inlet.

7. The apparatus according to claim 1, further comprising means for introducing a flow of a second filter media into said vessel so as to form a second filter bed, said second filter media bed disposed in said second portion of said gas flow path.

8. The apparatus according to claim 7, wherein said frusto-conical portion is disposed between said first and second filter beds.

9. The apparatus according to claim 8, wherein said frusto-conical portion has a plurality of holes formed therein.

10. The apparatus according to claim 1, further comprising means for introducing a flow of a second filter media into said vessel so as to form a second filter bed on top of said first filter bed.

11. A power generation system in which gas is produced for operating a power supply unit, said gas containing particulate from a combustion process, said system comprising a filtering vessel for removing a substantial portion of said particulate from said gas, said filtering vessel having:

a) a standleg having an inlet for receiving a first plurality of filtering members and an outlet for discharging said first plurality of filtering members, said standleg outlet having means for forming a first mass of said first plurality of filtering members into a first filter bed having a substantially frusto-conical shaped surface extending upward toward standleg outlet;

b) means for introducing a second plurality of filtering members into said vessel external of said standleg, said introducing means having means for forming said second plurality of filtering members into a second filter bed, said second filter bed disposed above said frusto-conical surface of said first filter bed; and c) means for directing said gas through said standleg and said first filter bed such that said gas flows through said frusto-conical surface of said first filter bed and then through said second filter bed to a gas outlet, whereby a substantial portion of the particulates in the gas are removed therefrom.

12. The power generation system of claim 11, wherein said combustion process produces ash, said first and second plurality of filtering members comprising pellets formed from said ash, and further comprising means for transforming the ash into said pellets.

13. The power generation system of claim 11, wherein said standleg inlet and said standleg outlet have a frusto-conical shape.

14. The power generation system of claim 13, wherein at least a portion of said standleg outlet is perforated.

15. Art apparatus for removing particulates from a flow of gas, comprising:
 a) a vessel having a gas inlet for receiving said flow of gas and a gas outlet for discharging said flow of gas, said vessel forming a gas flow path between said gas inlet and said gas outlet;
 b) means for introducing a flow of a first filter media into said vessel so as to form a first filter media bed therein, said first filter media having means for capturing at least a portion of said particulates in said gas;
 c) a filter media outlet for discharging said first filter media from said vessel, whereby said first filter media flows through said vessel;
 d) flow directing means for directing both said gas and said first filter media to flow in a first direction through a first portion of said gas flow path and then for turning said gas so that said gas flows in a second direction through a second portion of said gas flow path; and
 e) means for introducing a flow of a second filter media into said vessel so as to form a second filter bed, said second filter media bed disposed in said second portion of said gas flow path.

16. The apparatus according to claim 15, wherein said flow directing means comprises a standleg having an approximately frusto-conical portion disposed in said vessel, said frusto-conical portion disposed between said first and second filter beds.

17. The apparatus according to claim 16, wherein said frusto-conical portion has a plurality of holes formed therein.

18. The apparatus according to claim 15, wherein said first and second filter media comprise an ash produced from a combustion process.

19. An apparatus for removing particulates from a flow of gas, comprising:
 a) a vessel having a gas inlet for receiving said flow of gas and a gas outlet for discharging said flow of gas, said vessel forming a gas flow path between said gas inlet and said gas outlet;
 b) means for introducing a flow of a first filter media into said vessel so as to form a first filter media bed therein, said first filter media having means for capturing at least a portion of said particulates in said gas;
 c) a filter media outlet for discharging said first filter media from said vessel, whereby said first filter media flows through said vessel;
 d) flow directing means for directing both said gas and said first filter media to flow in a first direction through a first portion of said gas flow path and then for turning said gas so that said gas flows in a second direction through a second portion of said gas flow path; and
 e) means for introducing a flow of a second filter media into said vessel so as to form a second filter bed on top of said first filter bed.

20. The apparatus according to claim 19, wherein said flow directing means comprises a standleg having an approximately frusto-conical portion disposed in said vessel, said frusto-conical portion having a plurality of holes therein and disposed between said first and second filter beds.

21. The apparatus according to claim 20, wherein said first and second filter media comprise an ash produced from a combustion process, and further comprising means for transforming said ash into pellets.

* * * * *